US006931537B1

(12) United States Patent
Takura et al.

(10) Patent No.: US 6,931,537 B1
(45) Date of Patent: Aug. 16, 2005

(54) FOLDER TYPE TIME STAMPING SYSTEM AND DISTRIBUTED TIME STAMPING SYSTEM

(75) Inventors: Akira Takura, Kanagawa-ken (JP); Satoshi Ono, Tokyo (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 841 days.

(21) Appl. No.: 09/654,436

(22) Filed: Sep. 1, 2000

(30) Foreign Application Priority Data

Sep. 1, 1999 (JP) ............................................. 11-247993
Sep. 1, 1999 (JP) ............................................. 11-247994

(51) Int. Cl.[7] ................................................. H04L 9/00
(52) U.S. Cl. ........................................ 713/178; 713/180
(58) Field of Search ................................. 713/178, 187

(56) References Cited

U.S. PATENT DOCUMENTS

| 5,001,752 | A | | 3/1991 | Fischer | |
|---|---|---|---|---|---|
| 5,022,080 | A | | 6/1991 | Durst | |
| 5,136,643 | A | | 8/1992 | Fischer | |
| 5,136,646 | A | | 8/1992 | Haber | |
| 5,136,647 | A | | 8/1992 | Haber | |
| 5,422,953 | A | | 6/1995 | Fischer | |
| 5,625,693 | A | * | 4/1997 | Rohatgi et al. | ............. 713/187 |
| 5,768,382 | A | * | 6/1998 | Schneier et al. | ............ 380/251 |
| 5,768,389 | A | * | 6/1998 | Ishii | ............................ 380/30 |
| 5,781,629 | A | | 7/1998 | Haber | |
| 5,958,051 | A | | 9/1999 | Renaud et al. | |
| 6,601,172 | B1 | * | 7/2003 | Epstein | ....................... 713/178 |

FOREIGN PATENT DOCUMENTS

| GB | 2301919 | 12/1996 |
|---|---|---|
| JP | 6-501571 | 2/1994 |
| JP | 10039753 | 2/1998 |
| JP | 10105057 | 4/1998 |
| JP | 10-105057 | 4/1998 |
| JP | 10207360 | 8/1998 |
| JP | 10-326078 | 12/1998 |
| JP | 2000-235340 | 8/2000 |
| WO | WO 92/03000 | 2/1992 |
| WO | WO92/03000 | 2/1992 |
| WO | WO 98/39876 | 9/1998 |
| WO | WO 99/35785 | 7/1999 |

OTHER PUBLICATIONS

Stallings, William; Cryptography and Network Security; Jun. 4, 1998; Prentice–Hall, Inc.; $2^{nd}$ Edition; pp. 299–319.*
Schneier, Bruce; Applied Cryptography; 1996; John Wiley & Sons, Inc.; $2^{nd}$ Edition; pp. 47–100.*

* cited by examiner

*Primary Examiner*—Gilberto Barrón
*Assistant Examiner*—Jung Woo Kim
(74) *Attorney, Agent, or Firm*—Brenda O. Holmes; Kilpatrick Stockton LLP

(57) ABSTRACT

In a time stamping system formed by a client device and a server device, the client device includes a digest generation unit for generating a plurality of digests for a plurality of digital documents, a digest combining unit for combining the plurality of digests generated by the digest generation unit, a unified digest generation unit for generating a unified digest from the plurality of digests as combined by the digest combining unit, a transmission unit for transmitting a time stamping request containing the unified digest generated by the unified digest generation unit, to the server device, and a reception unit for receiving a time stamp token for the plurality of digital documents from the server device. The server device generates the time stamp token containing a time stamped digital document obtained by combining the unified digest and a time information acquired in response to the time stamping request, and a digital signature for the time stamped digital document.

11 Claims, 12 Drawing Sheets

FOLDER TYPE TIME STAMPING SYSTEM AND DISTRIBUTED TIME STAMPING SYSTEM

BACKGROUND OF THE INVENTION

1. Field of the Invention

The present invention relates to a folder type time stamping system and a distributed time stamping system that enable to prove that digital documents are not altered since a time of the time stamp and definitely existed at a time of the time stamp in a service for time stamping digital documents.

2. Description of the Background Art

Under the first to invent system of the U.S. patent practice, it is possible to use a dated research notebook as an evidence for establishing the priority date, and a date housekeeping book can be used as a record of disbursement for the final income tax return, for example. On the other hand, in conjunction with the increasing utilization of a PC on a daily basis, it has become popular to keep a daily record such as the research notebook and the housekeeping book by using a PC.

However, in the case of electronic digital records made on a PC, it has been difficult to prove the recorded content including the recorded date and time to a third person because such electronic digital records can be altered easily, unlike the records using papers as recording medium.

In this regard, there has been a proposition of a service for time stamping digital documents using a personal date/time notary device as disclosed in U.S. Pat. No. 5,422,953. In this personal date/time notary device, a time stamping device is incorporated into a smart card or the like and the time stamping is carried out at a time of the digital signature.

There has also been a proposition of a public/key date-time notary facility as disclosed in U.S. Pat. No. 5,001,752 and U.S. Pat. No. 5,136,643, in which a time stamping device is provided as a single hardware platform such that a document creator can carry out the time stamping using that device.

Both of these propositions are based on a scheme where a document creator carries out the time stamping so that the time stamp can be easily forged and there is no reliability as they do not amount to a proof by a third party.

There has been a proposition of an electronic notary as disclosed in U.S. Pat. No. 5,022,080, in which the time stamping is carried out by producing a compressed document using CRC (Cyclic Redundancy Check), parity and checksum for the original document in combination. For the compressed document produced in this scheme, it is easier to forge a digital document that has the same compressed document, compared with a compressed document produced by the hash function (such as MD5 or SHA-1, for example) that is currently widely used as the cryptographic technique.

There has also been a proposition of a digital document time-stamping scheme as disclosed in U.S. Pat. No. 5,136,646 and U.S. Pat. No. 5,136,647, in which a time stamp certificate is produced independently by an external time stamping agency. In this time stamping scheme, the external agency can easily forge the certificate.

In order to remedy these problems, there has been a proposition of a scheme for producing a time stamp certificate by digitally signing a compressed document obtained by applying a hash function to a digital document in which a received time stamping request is combined with an immediately previously issued time stamp certificate of the external agency. In this scheme, it is practically impossible for the external agency to forge the time stamp certificate, but the order among different rounds (constant periods for issuing time stamp certificates) cannot be verified.

Also, in order to prove that the time stamp certificate is authentic, the certificates issued up to that point will be necessary. Namely, it is impossible to prove the time stamp certificate as authentic unless either all the time stamp certificates issued by the external agency or those time stamp certificates that are necessary in tracing back to the value of the time stamp certificate at a time of the periodic public disclosure are stored. For this reason, the system requires an enormous memory capacity and an enormous amount of time in proving the authenticity.

Currently, the IETF (Internet Engineering Task Force) is in a process of standardizing a protocol in which a digital document compressed by the hash function is sent to an external agency, and a time stamp certificate is produced for this compressed digital document at the external agency. This proposed scheme already has a problem that it is impossible to eliminate a possibility for forging the time stamp certificate and a possibility for a malicious third party who is not permitted to acquire the time stamp certificate to illegally acquire the time stamp certificate.

On the other hand, Japanese Patent Application No. 11-35761 (1999) discloses a time-stamping device in which a single time stamping agency has partial secret keys that are equivalent to subdivided secret keys of the public key cryptosystem, and each partial signing agency which is a third party agency generates a partial signature independently, rather than generating a digital signature at a single time stamping agency, such that the forgery of the time stamp certificate by the time stamping agency is prevented.

In this time stamping device, it is possible to prove the existence of a digital document at high reliability by regularly producing a document creation log at a client side who wishes to utilize the time stamping agency, and producing a time stamp certificate regarding that document creation log at the time stamping agency.

Also, on the server side, the secret key of the time stamping device is distributed in division among a plurality of digital signature units and each digital signature unit generates a digital signature independently, in order to eliminate a possibility of having the secret key stolen that is present in the case where the external time stamping agency generates a digital signature using a single secret key, and a possibility of forging the time stamp of the past time by the conspiracy of the digital document author and the external time stamping agency.

In this way, it is possible to operate the external time stamping agencies to provide a safe and reliable time stamping service in which there is no risk of having the secret key stolen and the forgery of the time stamp is impossible unless the time stamping agency is in conspiracy with all the parties for generating digital signatures. Also, there is no need to store the time stamp certificates issued in the past at all, so that it is possible to reduce a required memory capacity considerably compared with the above described conventional method.

However, in the case where distributed time stamping agencies are to carry out the time stamping and generate the digital signature independently by using partial secret keys with respect to the same digital document, it is impossible to verify the digital signatures by using the public key corresponding to the distributed secret keys unless all the time stamping agencies attach the exactly identical time to the digital document before generating the digital signatures.

SUMMARY OF THE INVENTION

It is therefore an object of the present invention to provide a folder type time stamping system which can regularly acquire a time stamp certificate for digital documents from a reliable third party agency for the purpose of establishing a date and time and to keep them as records with a daily log similar to the research notebook and the housekeeping book, whereby the digital documents with the time stamp can be utilized in a form of a recording medium to prove the data and time to a third person.

It is another object of the present invention to provide a distributed time stamping system in which a unified digital signature obtained from a plurality of partial digital signatures can be decrypted using a single public key in the case of carrying out the time stamping and generating the digital signature independently at distributed time stamping agencies.

According to one aspect of the present invention there is provided a time stamping system, comprising a client device and a server device; the client device including: a digest generation unit for generating a plurality of digests for a plurality of digital documents: a digest combining unit for combining the plurality of digests generated by the digest generation unit; a unified digest generation unit for generating a unified digest from the plurality of digests as combined by the digest combining unit; a transmission unit for transmitting a time stamping request containing the unified digest generated by the unified digest generation unit, to the server device; and a reception unit for receiving a time stamp token for the plurality of digital document from the server device; and wherein the server device generates the time stamp token containing a time stamped digital document obtained by combining the unified digest and a time information acquired in response to the time stamping request, and a digital signature for the time stamped digital document.

According to another aspect of the present invention there is provided a client device of a time stamping system, the client device comprising: a digest generation unit for generating a plurality of digests for a plurality of digital documents; a digest combining unit for combining the plurality of digests generated by the digest generation unit; a unified digest generation unit for generating a unified digest from the plurality of digests as combined by the digest combining unit; a transmission unit for transmitting a time stamping request containing the unified digest generated by the unified digest generation unit, to a server device of the time stamping system; and a reception unit for receiving a time stamp token for the plurality of digital documents from the server device.

According to another aspect of the present invention there is provided a server device of a time stamping system, the server device comprising: a plurality of time acquisition units, each time acquisition unit sequentially acquiring the time information given in a prescribed constant incremental time unit, in response to a received digital document, independently from other time acquisition units; a plurality of combining units, provided in correspondence to the plurality of time acquisition units, each combining unit generating a plurality of time stamped digital documents by sequentially combining the received digital document with the time information sequentially acquired by a corresponding one of the time acquisition units, independently from the other combining units; a plurality of digital signature units, provided in correspondence to the plurality of combining units, each digital signature unit generating a digital signature for each time stamped digital document generated by a corresponding one of the combining units, independently from other digital signature units; a unified digital signature generation unit for selecting a plurality of digital signatures, one digital signature per each digital signature unit, which are generated by the plurality of digital signature units for one time stamped digital document of an identical time, from a plurality of digital signatures generated by the plurality of digital signature units, and generating a unified digital signature from selected digital signatures; and a time stamp token generation unit for generating the time stamp token from said one time stamped digital document and the unified digital signature generated by the unified digital signature generation unit.

According to another aspect of the present invention there is provided a time stamping method in a time stamping system formed by a client device and a server device, comprising the steps of: (a) generating a plurality of digests for a plurality of digital documents at the client device; (b) combining the plurality of digests generated by the step (a), at the client device; (c) generating a unified digest from the plurality of digests as combined by the step (b), at the client device; (d) transmitting a time stamping request containing the unified digest generated by the step (c), from the client device to the server device; (e) generating at the server device a time stamp token containing a time stamped digital document obtained by combining the unified digest and a time information acquired in response to the time stamping request, and a digital signature for the time stamped digital document; and (f) receiving the time stamp token for the plurality of digital documents from the server device, at the client device.

According to another aspect of the present invention there is provided a method of receiving a time stamping service at a client device of a time stamping system, the method comprising the steps of: (a) generating a plurality of digests for a plurality of digital documents; (b) combining the plurality of digests generated by the step (b); (c) generating a unified digest from the plurality of digests as combined by the step (b); (d) transmitting a time stamping request containing the unified digest generated by the step (c), to a server device of the time stamping system; and (e) receiving a time stamp token for the plurality of digital documents from the server device.

According to another aspect of the present invention there is provided a method of providing a time stamping service at a server device of a time stamping system, the method comprising the steps of: (a) sequentially acquiring a time information given in a prescribed constant incremental time unit, in response to a received digital document, at each one of a plurality of time acquisition units in the server device, independently from other time acquisition units; (b) generating a plurality of time stamped digital documents at each one of a plurality of combining units, provided in correspondence to the plurality of time acquisition units in the server device, by sequentially combining the received digital document with the time information sequentially acquired by a corresponding one of the time acquisition units, independently from other combining units; (c) generating a digital signature at each one of a plurality of digital signature units, provided in correspondence to the plurality of combining units in the server device, for each time stamped digital document generated by a corresponding one of the combining units, independently from other digital signature units; (d) selecting a plurality of digital signatures, one digital signature per each digital signature unit, which are generated by the plurality of digital signature units for one time stamped digital document of an identical time, from a plurality of digital signatures generated by the plurality of digital signature units, and generating a unified digital signature from selected digital signatures; and (e) generating the time stamp token from said one time stamped digital document and the unified digital signature generated by the step (d).

According to another aspect of the present invention there is provided a computer usable medium having computer readable program codes embodied therein for causing a computer to function as a client device of a time stamping system, the computer readable program codes including: a first computer readable program code for causing said computer to generate a plurality of digests for a plurality of digital documents; a second computer readable program code for causing said computer to combine the plurality of digests generated by the first computer readable program code; a third computer readable program code for causing said computer to generate a unified digest from the plurality of digests as combined by the second computer readable program code; a fourth computer readable program code for causing said computer to transmit a time stamping request containing the unified digest generated by the third computer readable program code, to a server device of the time stamping system; and a fifth computer readable program code for causing said computer to receive a time stamp token for the plurality of digital documents from the server device.

According to another aspect of the present invention there is provided a computer usable medium having computer readable program codes embodied therein for causing at least one computer to function as a server device of a time stamping system, the computer readable program codes including: a first computer readable program code for causing said at least one computer to realize a plurality of time acquisition units, each time acquisition unit sequentially acquiring the time information given in a prescribed constant incremental time unit, in response to a received digital document, independently from other time acquisition units; a second computer readable program code for causing said at least one computer to realize a plurality of combining units, provided in correspondence to the plurality of time acquisition units, each combining unit generating a plurality of time stamped digital documents by sequentially combining the received digital document with the time information sequentially acquired by a corresponding one of the time acquisition units, independently from other combining units; a third computer readable program code for causing said at least one computer to realize a plurality of digital signature units, provided in correspondence to the plurality of combining units, each digital signature unit generating a digital signature for each time stamped digital document generated by a corresponding one of the combining units, independently from other digital signature units; a fourth computer readable program code for causing said at least one computer to select a plurality of digital signatures, one digital signature per each digital signature unit, which are generated by the plurality of digital signature units for one time stamped digital document of an identical time, from a plurality of digital signatures generated by the plurality of digital signature units, and to generate a unified digital signature from selected digital signatures; and a fifth computer readable program code for causing said at least one computer to generate the time stamp token from said one time stamped digital document and the unified digital signature generated by the fourth computer readable program code.

Other features and advantages of the present invention will become apparent from the following description taken in conjunction with the accompanying drawings.

DETAILED DESCRIPTION OF THE PREFERRED EMBODIMENTS

Figure 1:
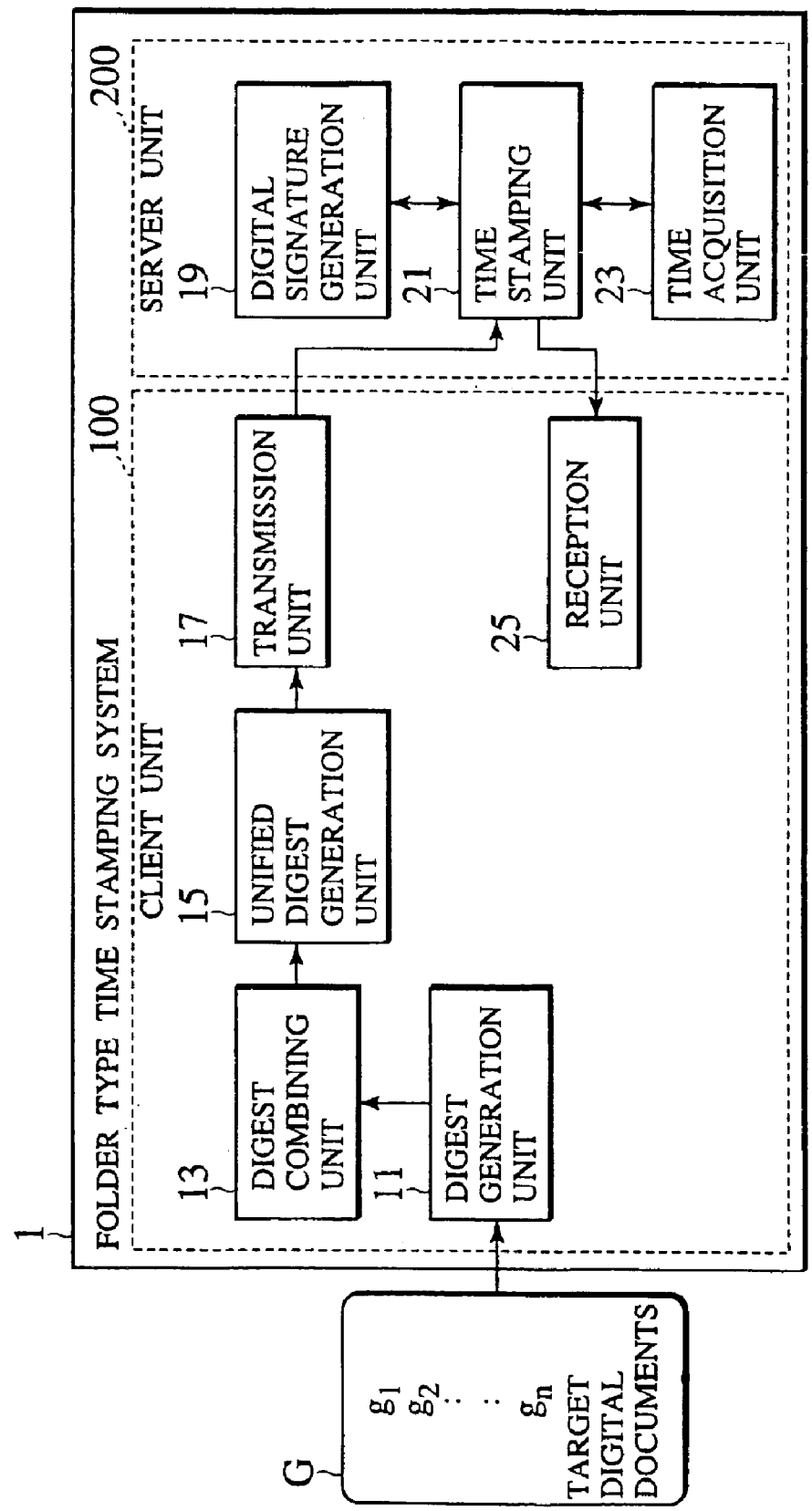
FIG. 1 is a block diagram showing an exemplary configuration of a folder type time stamping system according to the first embodiment of the present invention.
Figure 2:
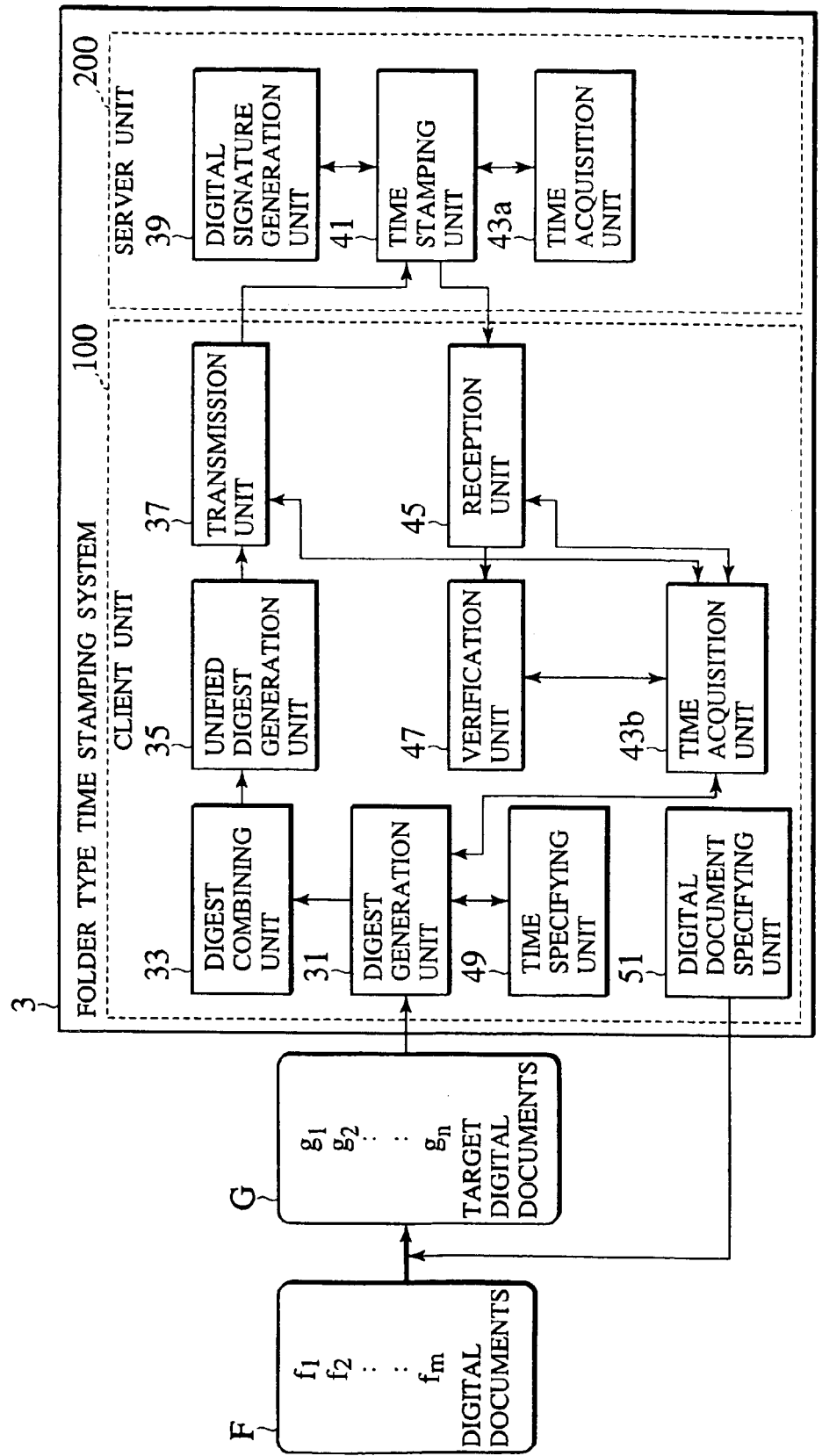
FIG. 2 is a block diagram showing an exemplary configuration of a folder type time stamping system according to the second embodiment of the present invention.

Referring now to FIG. 1 and FIG. 2, the first and second embodiments directed to a folder type time stamping system according to the present invention will be described in detail.

FIG. 1 shows a configuration of the folder type time stamping system according to the first embodiment of the present invention.

In FIG. 1, the folder type time stamping system 1 comprises: a digest generation unit 11 for generating digests of target digital documents G among digital documents that may contain any of text data, image data and speech data; a digest combining unit 13 for combining a plurality of digests generated by the digests generation unit 11; a unified digest generation unit 15 for generating a unified digest for a result obtained by combining a plurality of digests at the digest combining unit 13; a transmission unit 17 for transmitting data containing the unified digest generated by the unified digest generation unit 15, to a digital signature generation unit 19 through a time stamping unit 21; a digital signature generation unit 19 for combining a time acquired from a time acquisition unit 23 to the data containing the unified digest that is received from the unified digest generation unit 15 through the transmission unit 17, and generating a digital signature for the obtained combination as a whole; a time stamping unit 21 for sending a time stamp token (certificate) containing the unified digest, the time, and the digital signature generated or acquired above, to a reception unit 25; a time acquisition unit 23 for providing a time information indicating the time at a moment of an inquiry from the time stamping unit 21; and a reception unit 25 for receiving the time stamp token sent from the time stamping unit 21.

Here, the digest generation unit 11, the digest combining unit 13, the unified digest generation unit 15, the transmission unit 17, and the reception unit 25 constitute a client unit 100, while the digital signature generation unit 19, the time stamping unit 21, and the time acquisition unit 23 constitute a server unit 200.

In the following, the time stamping processing in this first embodiment will be described in detail with reference to FIG. 1.

The target digital document G produced by an author may contain any of text data, image data, speech data, and binary data or their combination. For these target digital documents G, the digests are generated by the digest generation unit 11 in the folder type times stamping system 1, using the hash function (such sa MD5 or SHA-1, for example) for each digital document, such that the processing becomes faster, the original document will not be sent to the server unit 200, and different values can be obtained for different documents at very high probabilities.

More specifically, denoting the hash function as h, and a plurality of digital documents that constitute the target digital documents G as $g_1, g_2, \ldots, g_n$, the digest generation unit 11 generates digests $h(g_1), h(g_2), \ldots, h(g_n)$.

Then, the digest combining unit 13 obtains $h(g_1) \bullet h(g_2) \ldots h(g_n)$ as a result of combining the digests $h(g_1), h(g_2), \ldots, h(g_n)$ by concatenation, for example.

The unified digest generation unit 15 generates the unified digest from this result of combining. Here, denoting the hash function used by the unified digest generation unit 15 as i, the unified digest generation unit 15 generates the unified digest $i(h(g_1) \bullet h(g_2) \ldots h(g_n))$. The transmission unit 17 then transmits this unified digest $i(h(g_1) \bullet h(g_2) \ldots h(g_n))$ to the digital signature generation unit 19 through the time stamping unit 21.

The digital signature generation unit 19 generates the digital signature s for a digital data containing the unified digest $i(h(g_1) \bullet h(g_2) \ldots h(g_n))$ and the time t acquired from the time acquisition unit 23, and sends this digital signature s to the time stamping unit 21.

Then, the time stamping unit 21 issues the time stamp token containing the digital signature s, the unified digest $i(h(g_1) \bullet h(g_2) \ldots h(g_n))$, and the time t, and sends this time stamp token to the reception unit 25.

According to the first embodiment, it becomes possible to acquire the time stamp token for digital documents on a PC in which a coherent system of documents are often formed by a combination of related documents, figures and tables, etc., in relation to these related documents or the other digital documents on the PC from which these related documents are produced, by regularly acquiring the time stamp token issued for the digital documents from a reliable third party agency for the purpose of the existence proof.

It is also possible to improve the reliability of the existence proof of the time stamped documents, and digital documents on PCs can be used as records with daily log similarly as the research notebook and the housekeeping book, and the document creation log can be utilized in a form of a recording medium at a time of proving to a third person.

In this way, it becomes possible to prove the the plurality of digital documents have not been altered since the time of the time stamp, and these plurality of digital documents definitely existed together at the time of the time stamp. Moreover, there is no need to judge the necessity of the time stamp token for each digital document separately and it suffices to acquire a single time stamp token for a plurality of digital documents collectively so that it becomes possible to utilize the time stamping service at lower cost.

Next, FIG. 2 shows a configuration of the folder type time stamping system according to the second embodiment of the present invention.

FIG. 2, the folder type time stamping system 3 comprises a digest generation unit 31 for generating digests of target digital documents G among digital documents F that may contain any of test data, image data and speech data; a digest combining unit 33 for combining a plurality of digests generated by the digest generation unit 31; a unified digest generation unit 35 for generating a unified digest for a result obtained by combining a plurality of digests at the digest combining unit 33; a transmission unit 37 for transmitting data containing the unified digest generated by the unified digest generation unit 35, to a digital signature generation unit 39 through a time stamping unit 41; a digital signature generation unit 39 for combining a time acquired from a time acquisition unit 43a to the data containing the unified digest that is received from the unified digest generation unit 35 through the transmission unit 37, and generating a digital signature for the obtained combination as a whole a time stamping unit 41 for sending a time stamp token (certificate) containing the unified digest, the time, and the digital signature generated or acquired above, to a reception unit 45; a time acquisition unit 43a for providing a time information indicating the time at a moment of an inquiry from the time stamping unit 41; a reception unit 45 for receiving the time stamp token sent from the time stamping unit 41; a verification unit 47 for verifying the time stamp token received through the reception unit 45; a time specifying unit 49 for specifying a timing for generating digests to the digest generation unit 31; a digital document specifying unit 51 for specifying the target digital documents G from the digital documents F; and a time acquisition unit 43b for providing a time information indicating the time at a moment of an inquiry from any of the digest generation unit 31, the transmission unit 37, the reception unit 45 and the verification unit 47. Note that the time acquisition unit 43a and the time acquisition unit 43b may be the same entity.

Here, the digest generation unit 31, the digest combining unit 33, the unified digest generation unit 35, the transmission unit 37, the reception unit 45, the verification unit 47, the time specifying unit 49, the digital document specifying unit 51, and the time acquisition unit 43b constitute a client unit 100, while the digital signature generation unit 39, the time stamping unit 41, and the time acquisition unit 43a constitute a server unit 200.

In the following, the time stamping processing in this second embodiment will be described in detail with reference to FIG. 2.

The digital document specifying unit 51 specifies the target digital documents G in units of files or folders, from the digital documents D that may contain any of text data, image data, speech data, and binary data or their combination that are located on a network or inside a PC which is accessible from a PC.

When the digest generation unit 31 detects that it is now the time specified from the time specifying unit 49, according to the time acquired from the time acquisition unit 43b, the digest generation unit 31 generates digests for these target digital documents G, using the hash function (such as MD5 or SHA-1, for example) for each digital document.

More specifically, denoting the has function as h, and a plurality of digital documents that constitute the target digital documents G as $g_1, g_2, \ldots, g_n$, the digest generation unit 31 generates digests $h(g_1), h(g_2), \ldots, h(g_n)$.

Then, the digest combining unit 33 obtains $h(g_1) \cdot h(g_2) \ldots h(g_n)$ as a result of combining the digests $h(g_1), h(g_2), \ldots, h(g_n)$ by concatenation, for example.

The unified digest generation unit 35 generates the unified digest from this result of combining. Here, denoting the hash function used by the unified digest generation unit 35 as i, the unified digest generation unit 35 generates the unified digest $i(h(g_1) \cdot h(g_2) \ldots h(g_n))$. The transmission unit 37 then transmits this unified digest $i(h(g_1) \cdot h(g_2) \ldots h(g_n))$ to the digital signature generation unit 39 through the time stamping unit 41.

The digital signature generation unit 39 generates the digital signature s for a digital data containing the unified digest $i(h(g_1) \cdot h(g_2) \ldots (h(g_n))$ and the time t acquired from the time acquisition unit 43a, and sends this digital signature s to the time stamping unit 41.

Then, the time stamping unit 41 issues the time stamp token containing the digital signature s, the unified digest $i(h(g_1) \cdot h(g_2) \ldots h(g_n))$, and the time t, and sends this time stamp token to the reception unit 45.

Then, the verification unit 47 verifies that the digital signature attached to the time stamp token received at the reception unit 45 is an authentic digital signature generated by the digital signature generation unit 39.

In addition, the verification unit 47 also verifies that the time attached to the time stamp token is after the time of transmission from the transmission unit 37 to the digital signature generation unit 39 and before the time of reception at the reception unit 45.

As described, according to the second embodiment, in addition to the effects described above for the first embodiment, it is possible to acquire the time stamp token regularly for files on the PC that are specified in units of files of folders, and record the file creation and modification log for files on the PC including relations with the related files, so that it becomes possible to use a sequence of the time stamp tokens acquired over a extended period of time as a proof for the file creation and modification log of files on the PC by a third person. This sequence of the time stamp tokens is more difficult to forge than the research notebook or the housekeeping book so that it becomes possible to provide a highly reliable time stamping service for digital documents.

Note that computer programs for realizing the folder type time stamping system as described above can be provided in forms of recording media such that these programs can be distributed more easily using these recording media.

Referring now to FIG. 3 to FIG. 9, the third and fourth embodiments directed to a distributed time stamping system according to the present invention will be described in detail.

Figure 3:
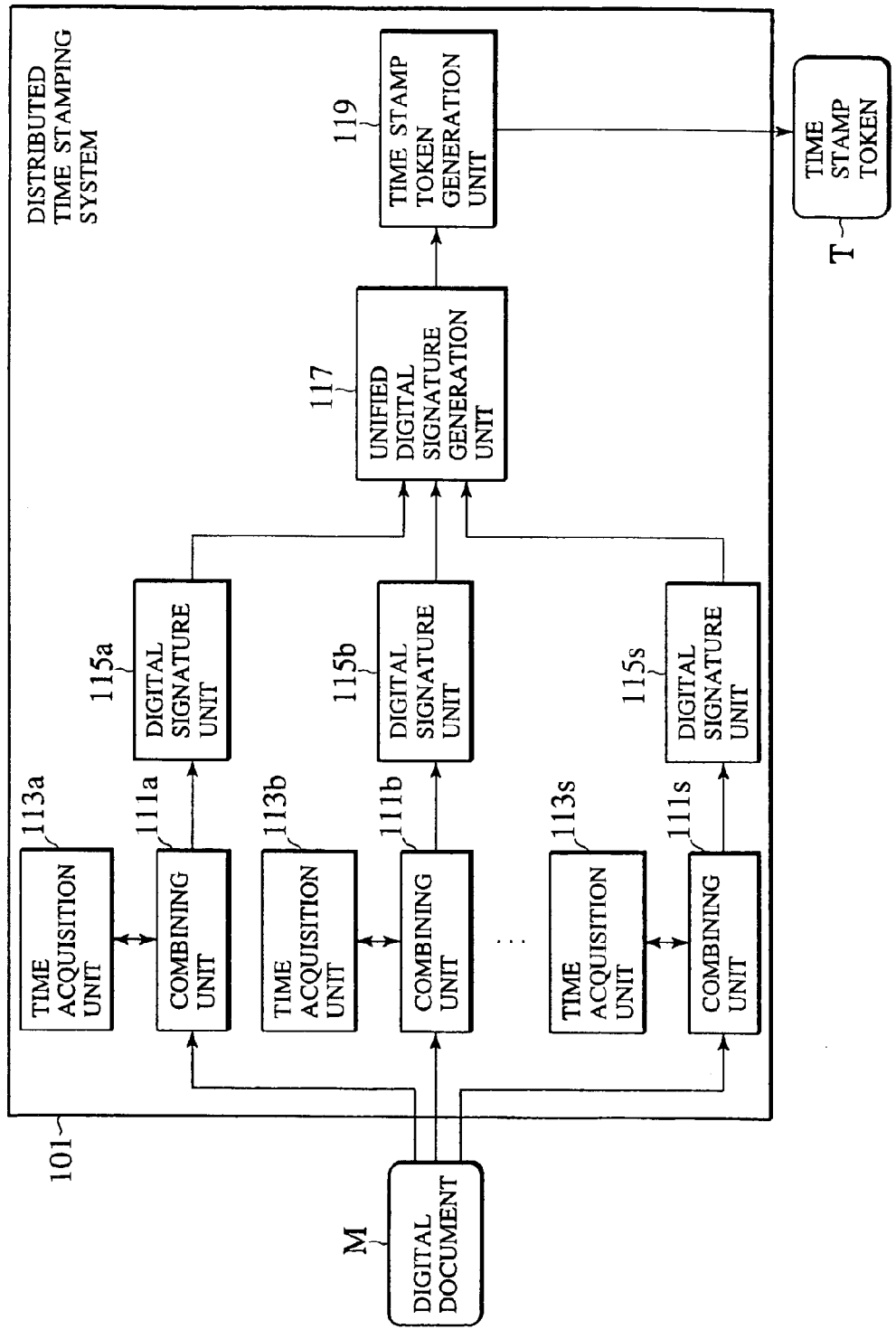
FIG. 3 is a block diagram showing an exemplary configuration of a distributed time stamping system according to the third embodiment of the present invention.

FIG. 3 shows a configuration of the distributed time stamping system according to the third embodiment of the present invention.

In FIG. 3, the distributed time stamping system 101 comprises: a plurality of time acquisition units 113a, 113b, ..., 113s for acquiring time information $t_1, t_{2i}, \ldots, t_{si}$ having a constant incremental time unit, independently for n times where n is an integer greater than or equal to one, at a constant acquisition interval; a plurality of combining units 111a, 111b, ..., 111s provided respectively in correspondence to the time acquisition units 113a, 113b, ..., 113s, for independently and successively producing a time stamped digital document $Mt_{ij}$, by combining a the respective time information $t_{ij}$ with a digital document M; a plurality of digital signature units 115a, 115b, ..., 115s provided respectively in correspondence to the combining units 111a, 111b, ..., 111s, for independently generating a digital signature for each respective time stamped digital document $Mt_{ij}$; a unified digital signature generation unit 117 for receiving a plurality of digital signatures generated independently by the plurality of digital signature units 115a, 115b, ..., 115s, selecting digital signatures for a time stamped digital document Mt of an identical time from these plurality of digital signatures, one digital signature per each one of the digital signature units 115a, 115b, ..., 115s, and generating a unified digital signature c from the selected digital signatures for the time stamped digital document Mt of the identical time; and a time stamp token generation unit 119 for generating a time stamp token (certificate) T containing the time stamped digital document Mt and the unified digital signature c.

In the following, the distributed time stamping processing in this third embodiment will be described in detail with reference to FIG. 3, Here, the description will be given for a sub-system related to the combining unit 111a alone, but the operations of the other sub-systems related to the combining units are similar.

The digital document M produced by an author may contain any of text data, image data, speech data, and binary data or their combination. This digital document M is combined with a time acquired from the time acquisition unit 113a to produce a time stamped digital document Mt at the combining unit 111a in the distributed time stamping system 101. Then, a digital signature for this time stamped digital document Mt is generated at the digital signature unit 115a. The digital signatures generated by the digital signature units 115a, 115b, ..., 115s in this manner are collected to the unified digital signature generation unit 117.

Then, the unified digital signature generation unit 117 generates the unified digital signature from the digital signatures for the time stamped digital document Mt of the identical time, whenever it is possible to select one time stamped digital document Mt of the identical time for each digital signature unit 115. Then, the time stamp token generation unit 119 generates a time stamp token T containing the unified digital signature itself and the time stamped digital document Mt used in generating the unified digital signature.

Now, the digital signature generation will be described for an exemplary case. Here, the RSA public key cryptosystem will be used as an exemplary public key cryptosystem.

First, for sufficiently large prime numbers p and q, n is defined as n=pq and an integer e that is relatively prime with respect to $$\phi(n)=(p-1)(q-1)$$

is appropriately selected. That is:

$$\gcd(e, (p-1)(q-1))=1$$

Then, setting n and e as the public keys, an integer d that satisfies $$ed=1 \bmod \phi(n)$$

is selected and p, q, and d are set as the secret keys.

For a digest m obtained by applying a hash function (such as MD5 or SHA-1, for example) to the time stamped digital document Mt of the identical time, the unified digital signature c to be generated by the unified digital signature generation unit 117 is given by $$c=m^d \bmod n.$$

When the total number of the digital signature units 115 in FIG. 3 is s, if d is expressed in a form of a sum of numbers as $$d=d_1+d_2+\ldots +d_s$$

then the digital signatures $c_1, c_2, \ldots, c_5$ to be generated by the digital signature units 115a, 115b, ..., 115s are given by $$c_1=m^{d1} \bmod n, \ldots, c_5=m^{d5} \bmod n.$$

The time stamp token T is obtained as a digital document containing (Mt, c).

Figure 4:
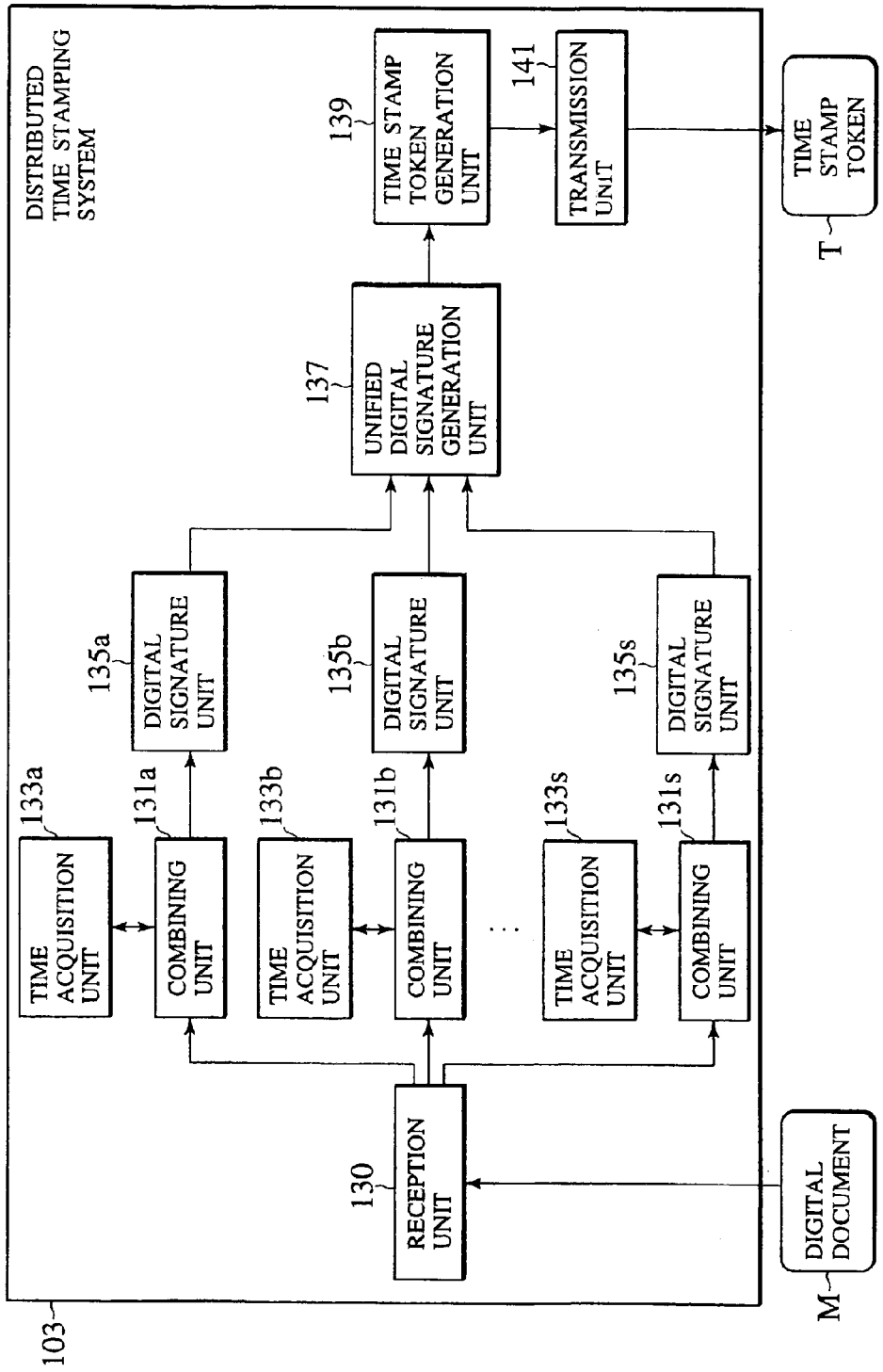
FIG. 4 is a block diagram showing an exemplary configuration of a distributed time stamping system according to the fourth embodiment of the present invention.

Next, FIG. 4 shows a configuration of the distributed time stamping system according to the fourth embodiment of the present invention.

In FIG. 4, the distributed time stamping system 103 comprises: a reception unit 130 for receiving a digital document M by communications; a plurality of time acquisition units 133a, 133b, ..., 133s for acquiring time information $t_{1i}, t_{si}, \ldots, t_{si}$ having a constant incremental time unit, independently for n times where n is an integer at least greater than or equal to one, at a constant acquisition interval; a plurality of combining units 131a, 131b, ..., 131s provided respectively in correspondence to the time acquisition units 133a, 133b, ..., 133s, for independently and successively producing a time stamped digital document $Mt_{ij}$ by combining a the respective time information $t_{ij}$ with the digital document M received by the reception unit 130; a plurality of digital signature units 135a, 135b, ..., 135s provided respectively in correspondence to the combining units 131a, 131b, 131s, for independently generating a digital signature for each respective time stamped digital document $Mt_{ij}$; a unified digital signature generation unit 137 for receiving a plurality of digital signatures generated independently by the plurality of digital signature units 135a, 135b, ..., 135s, selecting digital signatures for a time stamped digital document Mt of an identical time from these plurality of digital signatures, one digital signature per each one of the digital signature units 135a, 135b, , 135s, and generating a unified digital signature c from the selected digital signatures for the time stamped digital document Mt of the identical time; a time stamp token generation unit 139 for generating a time stamp token (certificate) T containing the time stamped digital document Mt and the unified digital signature c; and a transmission unit 141 for returning the time stamp token T generated by the time stamp token generation unit 139, to a sender of the digital document M by communications.

Figure 5:
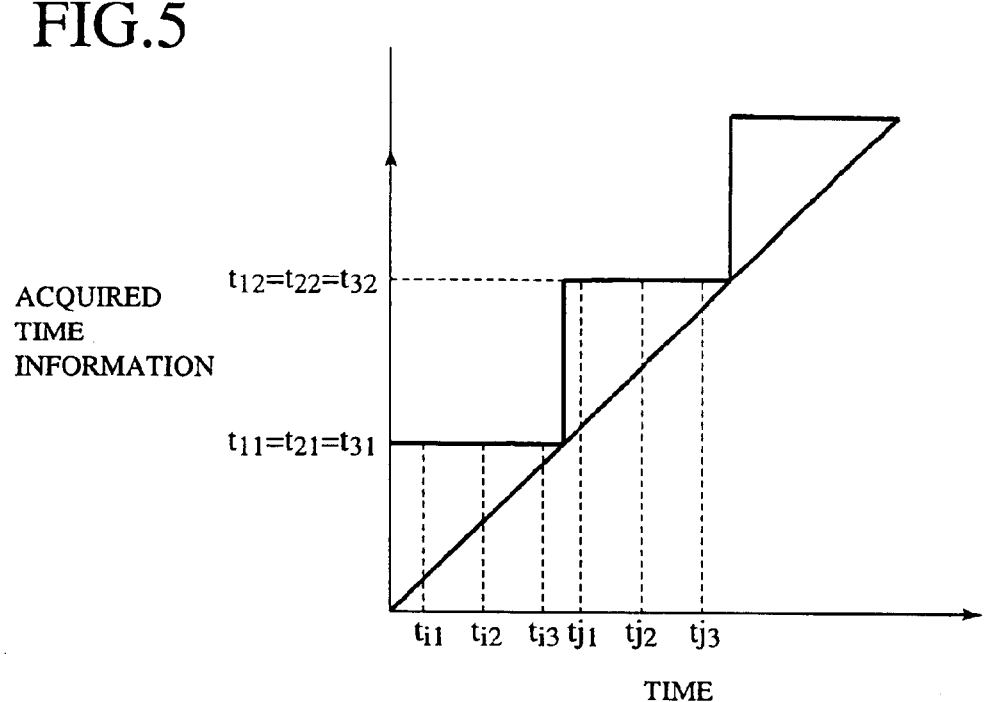
FIG. 5 is a diagram showing one example of acquired time information in the distributed time stamping system of FIG. 3 and FIG. 4.
Figure 6:
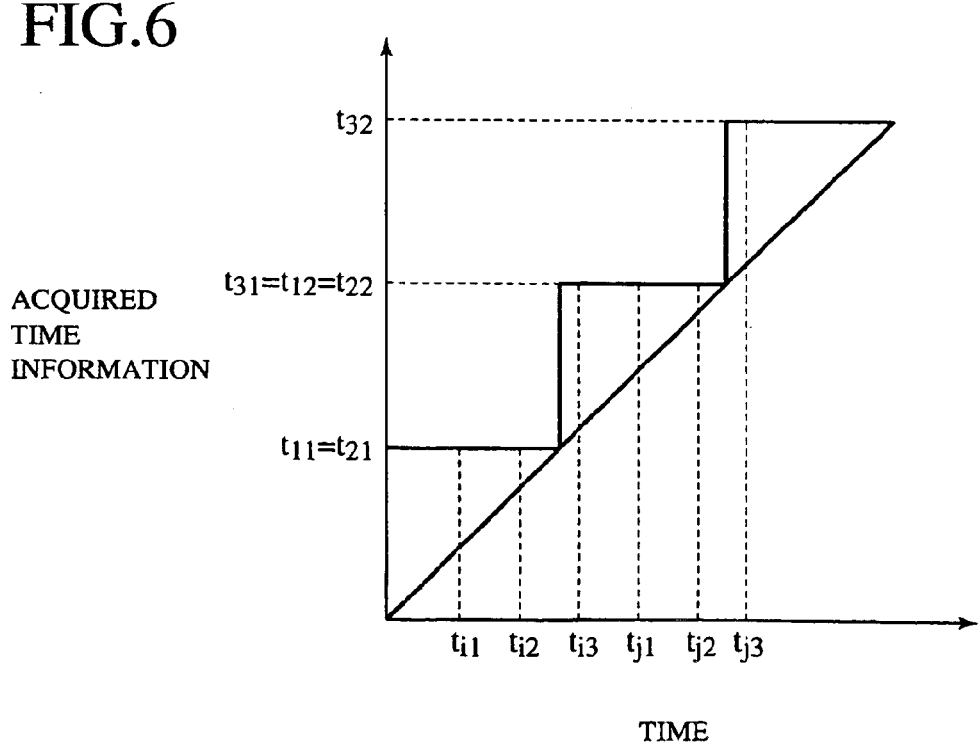
FIG. 6 is a diagram showing another example of acquired time information in the distributed time stamping system of FIG. 3 and FIG. 4.

FIG. 5 and FIG. 6 show relationships among the acquired time information in the third and fourth embodiments. Here, the relationships among the acquired time information are shown for an exemplary case of using three digital signature units. In FIG. 5 and FIG. 6, $t_{11}, t_{21}, t_{31}$ respectively represent times acquired by the three time acquisition units in the first attempt, while $t_{12}, t_{22}, t_{32}$ respectively represent times acquired by the three time acquisition units in the second attempt. Also, $t_{i1}, t_{i2}, t_{i3}$ respectively represent accurate times at which the first attempt of the time acquisition is made by the three time acquisition units, while $t_{j1}, t_{j2}, t_{j3}$ respectively represent accurate times at which the second attempt of the time acquisition is made by the three time acquisition units.

FIG. 5 indicates that all three times acquisition units have acquired the same time information in the first attempt, and they have done so in the second attempt as well. In this case, $t_{11}=t_{21}=t_{31}$ will be the time used in generating the unified digital signature. Similarly, FIG. 6 indicates that the same time information was acquired by the second attempts of the first and second time acquisition units and the first attempt of the third time acquisition unit. In this case, $t_{31}=t_{12}=t_{22}$ will be the time used in generating the unified digital signature.

Figure 7:
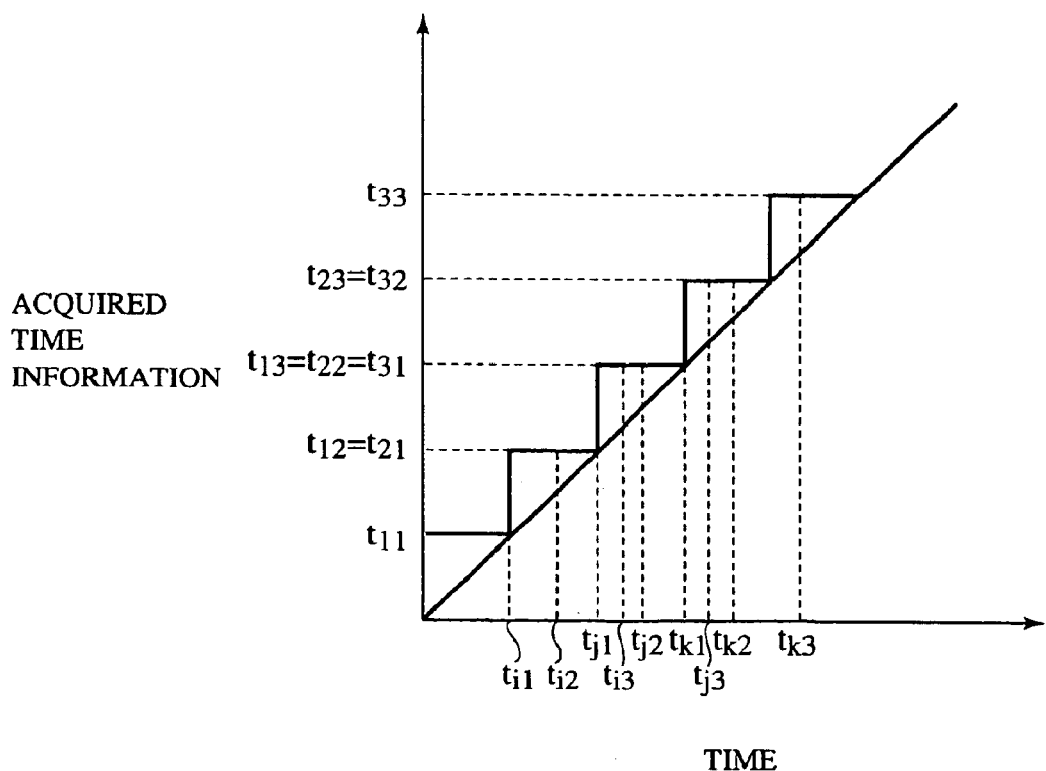
FIG. 7 is a diagram showing another example of acquired time information in the distributed time stamping system of FIG. 3 and FIG. 4.

FIG. 7 shows a relationship between the acquired time information and the accurate time of the time acquisition in the case where the incremental time unit of the time information is set to be a half of that used in FIG. 6. In FIG. 7, $t_{11}, t_{21}, t_{31}$ respectively represent times acquired by the three time acquisition units in the first attempt, $t_{12}, t_{22}, t_{32}$ respectively represent times acquired by the three time acquisition units in the second attempt, and $t_{13}, t_{23}, t_{32}$ respectively represent times acquired by the three time acquisition units in the third attempt. Also, $t_{i1}, t_{i2}, t_{i3}$ respectively represent accurate times at which the first attempt of the time acquisition is made by the three time acquisition units, $t_{j1}, t_{j2}, t_{j3}$ respectively represent accurate times at which the second attempt of the time acquisition is made by the three time acquisition units, and $t_{k1}, t_{k2}, t_{k3}$ respectively represent accurate times at which the third attempt of the time acquisition is made by the three time acquisition units. In this example where the incremental time unit is a half, there is a need for each time acquisition unit to carry out the time acquisition at least three times in order to acquire the same time information by all three time acquisition units.

Note that the constant acquisition interval by which the time acquisition is to be carried out by each time acquisition unit can be set to an arbitrary length, but it should preferably be set equal to the constant incremental time unit of the time to be acquired by each time acquisition unit.

Also, instead of actually carrying out the time acquisition in the second and subsequent attempts, it is possible to obtain the acquired times for the second and subsequent attempts by adding prescribed times in the constant incremental time unit sequentially to the time acquired in the first attempt. In this case if suffices for each time acquisition unit to carry out the time acquisition only once.

The constant incremental time unit of the time to be acquired by each time acquisition unit can be set to an arbitrary length, but when the incremental time unit is made shorter, even though an accuracy of the acquired time can be improved, the number of the digital signatures that are required to be generated by each digital signature unit until it becomes possible to select the time stamped digital document Mt of the identical time for each one of the digital signature units will be increased.

Note however that, when the arrival time of the digital document M at each combining unit is different for different combining units, it is possible to reduce the number of digital signatures to be generated by the digital signature units other than that corresponding to the combining unit which requires the longest arrival time by controlling them not to carry out the digital signature generation for at least one of times that have no chance of being used as the identical time, as follows.

Figure 8:
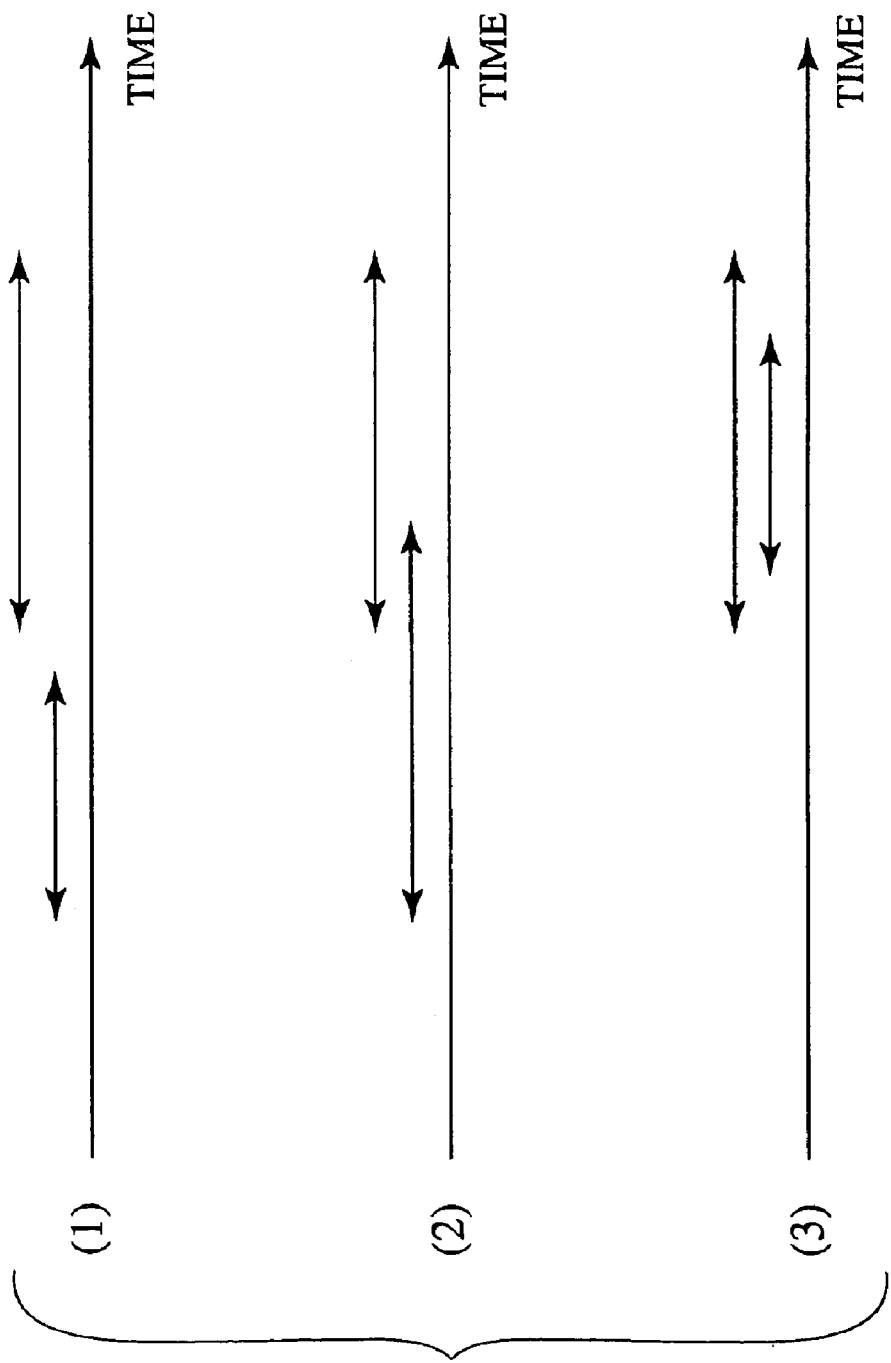
FIG. 8 is a diagram showing a relationship between potential digital document arrival time intervals for two different combining units in the distributed time stamping system of FIG. 3 and FIG. 4.

FIG. 8 shows a relationship between time intervals in which the digital document may arrive at two different combining units. A part (1) of FIG. 8 represents a case where the latest possible arrival time for one combining unit is earlier than the earliest possible arrival time for another combining unit, a part (2) of FIG. 8 represents a case where the latest possible arrival time for one combining unit is contained in the potential arrival time interval for another combining unit and the earliest possible arrival time for the former combining unit is earlier than the earliest possible arrive time for the latter combining unit, and a part (3) of FIG. 8 represents a case where the potential arrival time interval for one combining unit is completely contained within the potential arrival time interval for another combining unit. All conceivable relationships between the potential arrival time intervals for arbitrary two combining units are covered by these three cases.

Figure 9:
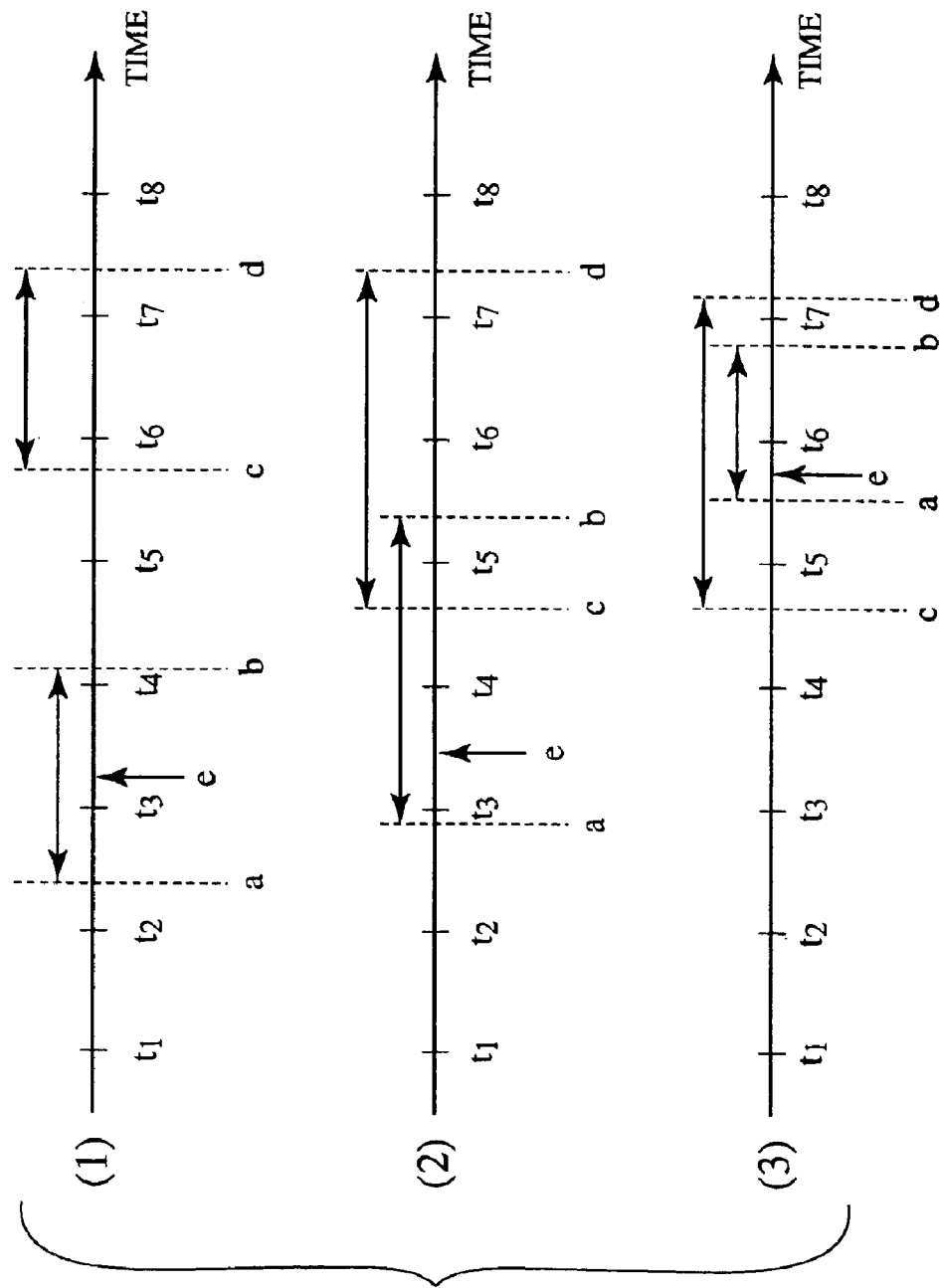
FIG. 9 is a diagram showing an example of potential digital document arrival time intervals and actual digital document arrival time for two different combining units in the distributed time stamping system of FIG. 3 and FIG. 4.

FIG. 9 shows a timing relationship in the case where the potential arrival time interval for the combining unit to which the digital document can arrive latest lies between a time "c" and a time "d", and the potential arrival time interval for another arbitrary combining unit lies between a time "a" and a time "b". Parts (1), (2) and (3) of FIG. 9 are cases corresponding to those of parts (1), (2) and (3) of FIG. 8. Here the combining unit to which the digital document can arrive latest will be denoted as C1, and another arbitrary combining unit will be denoted as C2. Also, the incremental time unit, i.e., an interval between $t_1$ and $t_{i+1}$, will be denoted as u.

In general, each combining unit can be controlled to generate the time stamped digital documents by setting a generation start timing at a time obtained by adding a prescribed time not less than zero that is defined in order to eliminate times that will never be used for the unified digital signature generation, to a predetermined time that is closest to but not earlier than the current time, and combining the digital document sequentially with the time information given by up to a specified number of prescribed incremental time units starting from the generation start timing.

Here, the prescribed time not less than zero is used such that, when there is a fixed displacement between digital document arrival times at different combining units, the combining unit that would have otherwise started to generate the time stamped digital documents earlier will delay a start of the time stamped digital document generation to account for that displacement.

Also, the specified number is used such that, even when there is a variation in the potential digital document arrival time interval for the combining unit, it is still possible to obtain the time stamped digital document of the identical time for each one of the digital signature units so that the unified digital signature can be generated without a failure.

In the case of part (1) of FIG. 9, when a value of a product of u and a largest integer n not exceeding (c-b)/u is v and the digital document arrives to C2 at a time "e" between $t_3$ and $t_4$, the current time is "e", the predetermined time not earlier than the current time can be set to $t_4$ and the prescribed time not less than zero can be set to v=n*u=1*u since n=1. In addition, the prescribed incremental time unit is u, and the specified number can be set to a number obtained by adding 1 and then subtracting n from a smallest integer m greater than or equal to (d-a)/u. In this case, m=5, so that the specified number will be 5+1−1=5.

As a result, there is not need to generate the time stamped digital document for the time $t_4$ and it suffices to generate only five time stamped digital documents for $t_5$, $t_6$, $t_7$, $t_8$ and $t_9$, starting from $t_5$ obtained by adding v to $t_4$. Similarly, if "e" is between "a" and $t_3$, it will suffice to generate only five time stamped digital documents for $t_4$, $t_5$, $t_6$, $t_7$ and $t_8$, and if "e" is between $t_4$ and "b", it will suffice to generate only five time stamped digital documents for $t_6$, $t_7$, $t_8$, $t_9$ and $t_{18}$.

In the case of part (2) of FIG. 9, when the digital document arrives to C2 at a time "e" between $t_3$ and $t_4$, the current time is "e", the predetermined time not earlier than the current time can be set to $t_4$ and the prescribed time not less than zero can be set to 0. If "e" is between "c" and $t_5$, C2 starts the time acquisition from $t_6$ that is immediately after "e". In addition, the prescribed incremental time unit is u, and the specified number can be set to a number obtained by adding 1 to a smallest integer m greater than or equal to (d-a)/u. In this case, the specified number will be 6 so that only six time stamped digital documents for $t_4$, $t_5$, $t_6$, $t_7$, $t_8$ and $t_9$ will be generated.

In the case of part (3) of FIG. 9, when the digital document arrives to C2 at a time "e" between $t_5$ and $t_6$, the current time is "e", the predetermined time not earlier than the current time can be set to $t_6$ and the prescribed time not less than zero can be set to 0. In addition, the prescribed incremental time unit is u, and the specified number can be set to a number obtained by adding 1 to a smallest integer m greater than or equal to (d-a)/u. In this case, the specified number will be 3 so that only three time stamped digital documents for $t_6$, $t_7$ and $t_8$ will be generated.

Now, usually, in the distributed time stamping system, the digital signature units that constitute the system maintains parts of the secret key of the public key cryptosystem distributedly, so that a possibility of having the secret key stolen or a possibility of having the time stamp token forged can be reduced, but a possibility for the times independently acquired by the time acquisition units to coincide is very small as already mentioned above so that there arises a problem that the unified digital signature cannot be generated.

In this regard, in the third and fourth embodiments, the time is acquired at a constant incremental time unit as described above, so that it is possible to increase a possibility for the independently acquired times to coincide. In fact, in an example shown in FIG. 5 and FIG. 6, it is possible to obtain the time stamped digital document of the identical time for every combining unit without a failure, when each time acquisition unit carries out the time acquisition at least twice at a constant acquisition interval, because of the relationship between the incremental time unit and the time difference between the time acquisition execution times among the time acquisition units. As a result, it becomes possible to realize the distributed time stamping with the improved safety of the secret key.

Note that computer programs for realizing the distributed time stamping system as described above can be provided in forms of recording media such that these programs can be distributed more easily using these recording media.

Note also that the third and fourth embodiments are described above for the case of using the RSA public key cryptosystem, but the present invention is not limited to this case and it is possible to generate the digital signatures and the unified digital signature similarly by using the other public key cryptosystems in which the digital signature that can be generated by using a single secret key can also be generated by using a plurality of divided secret keys obtained by dividing the secret key of the elliptic curve public key crystosystem, DSA (Digital Signature Algorithm), etc.

It is also possible to generate the unified digital signature by using a digital document that contains the time stamped digital document Mt rather than the time stamped digital document Mt itself. It is also possible to generate the digital signature directly without applying the hash function to the digital document. One time stamped digital document Mt may be set in correspondence to one time information, or in correspondence to a plurality of time information. In the former case one digital signature will generated from one time stamped digital document Mt, whereas in the latter case a plurality of digital signatures will be generated from one time stamped digital document Mt.

As described, according to the third and fourth embodiments, it becomes possible to obtain the time stamped digital document of the identical time at every combining unit without a failure so that it becomes possible to realize the distributed time stamping with the improved safety of the secret key.

Referring now to FIG. 10 to FIG. 13, the fifth embodiment directed to a folder type distributed time stamping system according to the present invention will be described in detail.

Figure 10:
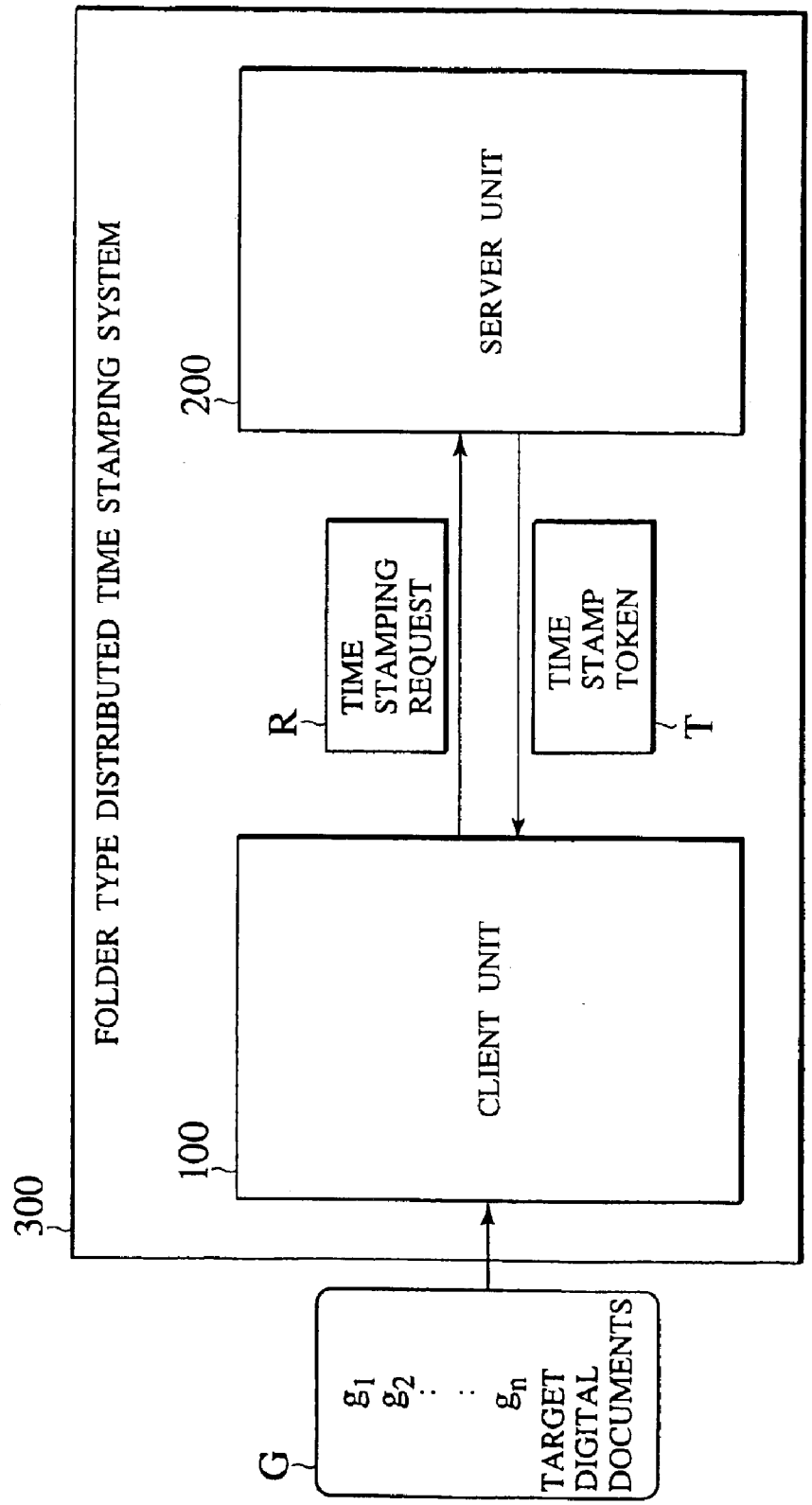
FIG. 10 is a block diagram showing an exemplary configuration of a folder type distributed time stamping system according to the fifth embodiment of the present invention.

FIG. 10 shows a configuration of the folder type distributed time stamping system according to the fifth embodiment of the present invention. This fifth embodiment is a combination of the folder type time stamping system of the first and second embodiments and the distributed time stamping system of the third and fourth embodiments.

In FIG. 10, the folder type distributed time stamping system 300 generally comprises a client unit 100 and a server unit 200. The client unit 100 generates a time stamping request R from a plurality of digital documents G that are the target of time stamping, and gives it to the server unit 200. The server unit 200 generates a time stamping token (certificate) T according to the received time stamping request R, and returns it to the client unit 100.

Figure 11:
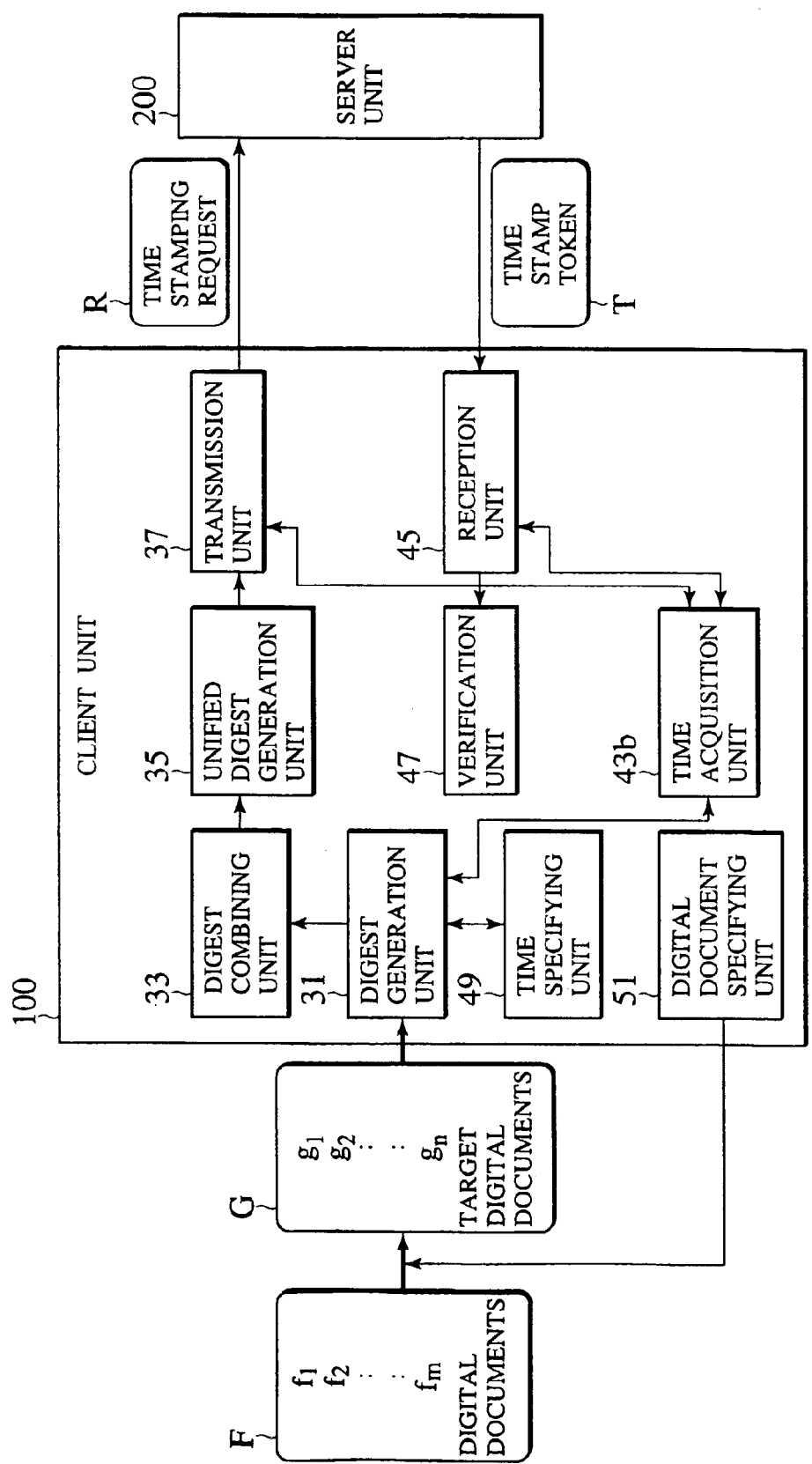
FIG. 11 is a block diagram showing an exemplary configuration of a client unit in the folder type distributed time stamping system of FIG. 10.

FIG. 11 shows an exemplary configuration of the client unit 100 in the folder type distributed time stamping system 300 of FIG. 10. The client unit 100 of FIG. 11 corresponds to the client unit 100 of FIG. 2 in the second embodiment described above, so that the same elements are given the same reference numerals in the figure.

First, the digital document specifying unit 51 selects the digital documents G that are the target of time stamping from the digital documents F.

Then, at a regular digest generation time specified by the time specifying unit 49, the digest generation unit 31 generates digests of the selected digital documents. Here, it is possible to utilize the previously generated digests for those digital documents whose contents have not been modified since the digests are generated previously.

Then, the digest combining unit 33 generates a new digital document by combining the digests of the target digital documents G generated by the digest generation unit 31.

Then, the unified digest generation unit 36 generates the unified digest from this new digital document.

Then, the time stamping request R containing the unified digest is transmitted from the transmission unit 37 to the server unit 200.

At the server unit 200, the time stamp taken T is generated as described below, and returned to the reception unit 45 of the client unit 100.

Then, the verification unit 47 compares the transmission time by the transmission unit 37, the reception time by the reception unit 45, and the stamped time recorded in the received time stamp taken T, verifies using a public key corresponding to the secret key used by the server unit 200 that the digital signature contained in the time stamp token T is the authentic digital signature generated by the server unit 200, and verifies that the digests time stamped by the time stamp token T are those transmitted from the transmission unit 37.

Here, by including the previously obtained time stamp tokens in the target digital documents G, it becomes possible to acquire the time stamp token that includes the past creation and modification log of the target digital documents G.

Figure 12:
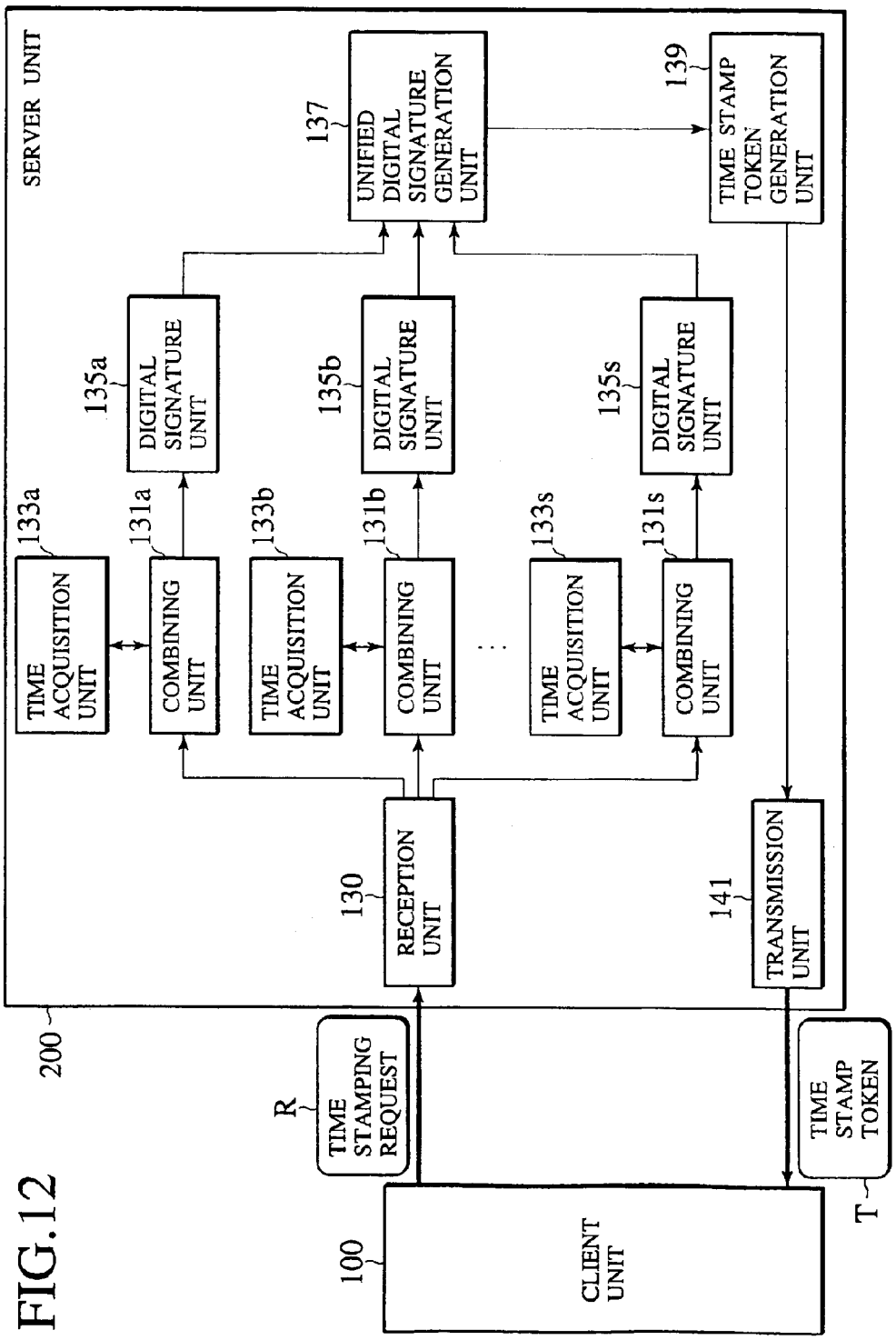
FIG. 12 is a block diagram showing one exemplary configuration of a server unit in the folder type distributed time stamping system of FIG. 10.

FIG. 12 shows an exemplary configuration of the server unit 200 in the folder type distributed time stamping system 300 of FIG. 10. The server unit 200 of FIG. 12 corresponds to the distributed time stamping system of FIG. 4 in the fourth embodiment described above, so that the same elements are given the same reference numerals in the figure.

First, when the reception unit 130 receives the time stamping request R, its copy is sent to each combining unit 131.

Then, each combining unit 131 generates the time stamped digital document Mt by combining the digital document M contained in the time stamping request R with the time acquired by the corresponding time acquisition unit 133.

Then, the corresponding digital signature unit 135 generates the digital signature for this time stamped digital document Mt using the partial secret key acquired in advance. The digital signatures generated by the digital signature units 135 in this manner are collected to the unified digital signature generation unit 137.

Then, the unified digital signature generation unit 137 selects digital signatures having the identical time information among the collected digital signatures, one digital signature for each digital signature unit 135, and generates the unified digital signature.

Then, the time stamp token generation unit 139 generates the time stamp token T using the unified digital signature, and the transmits it from the transmission unit 141 to the client unit 100.

Figure 13:
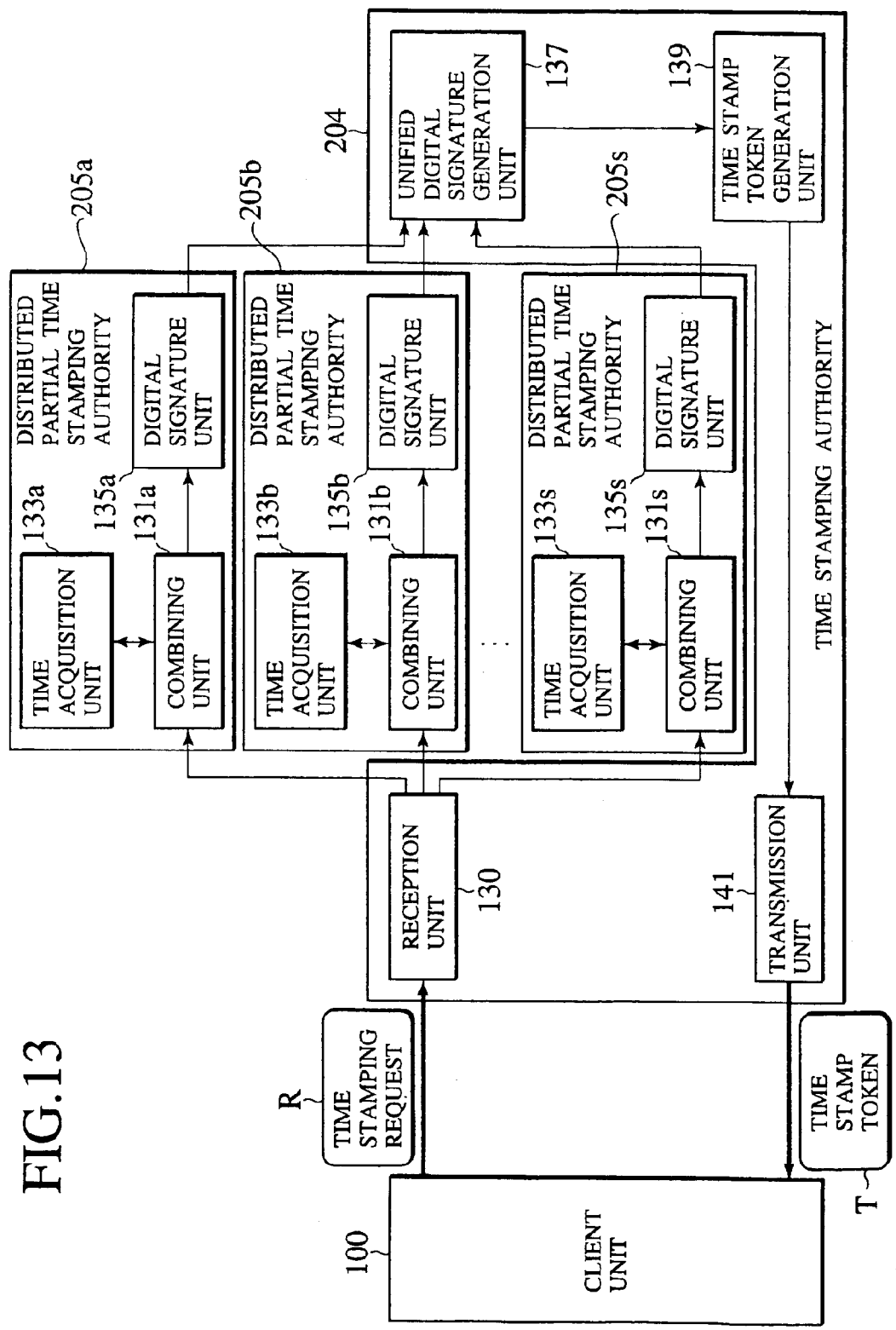
FIG. 13 is a block diagram showing another exemplary configuration of a server unit in the folder type distributed time stamping system of FIG. 10.

FIG. 13 shows another exemplary configuration of the server unit 200 in the folder type distributed time stamping system 300 of FIG. 10. The server unit 200 of FIG. 13 adopts a distributed configuration in which the functions of the server unit 200 are to be operated by independent third party authories, where the same elements as in the server unit 200 of FIG. 12 are given the same reference numerals in the figure.

FIG. 13 differs from FIG. 12 in that a set of one combining unit 131, one time acquisition unit 133 and one digital signature unit 135 constitute one distributed partial time stamping authority 205, and the reception unit 130, the unified digital signature generation unit 137, the time stamp token generation unit 139 and the transmission unit 141 constitute one time stamping authority 204, but the operation of each unit is the same as in the case of FIG. 12.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the client unit or the server unit of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A time stamping system, comprising a client device and a server device;

the client device including:
a digest generation unit for generating a plurality of digests for a plurality of digital documents;
a digest combining unit for combining the plurality of digests generated by the digest generation unit;
a unified digest generation unit for generating a unified digest from the plurality of digests as combined by the digest combining unit;
a transmission unit for transmitting a time stamping request containing the unified digest generated by the unified digest generation unit, to the server device; and
a reception unit for receiving a time stamp token for the plurality of digital documents from the server device; and the server device including:
a plurality of time acquisition units, each time acquisition unit sequentially acquiring time information given in a prescribed constant incremental time unit, in response to the time stamping request, independently from other time acquisition units;
a plurality of combining units, provided in correspondence to the plurality of time acquisition units, each combining unit generating a plurality of time stamped digital documents by sequentially combining a data containing the unified digest with the time information sequentially acquired by a corresponding one of the time acquisition units, independently from other combining units;
a plurality of digital signature units, provided in correspondence to the plurality of combining units, each digital signature unit generating a digital signature for each time stamping digital document generated by a corresponding one of the combining units, independently from other digital signature units;
a unified digital signature generation unit for selecting a plurality of digital signatures, one digital signature per each of the digital signature units, which are generated by the plurality of digital signature units for one time stamped digital document of an identical time, from a plurality of digital signatures generated by the plurality of digital signature units, and generating a unified digital signature from the selected digital signatures; and
a time stamp token generation unit for generating the time stamp token from said one time stamped digital document and the unified digital signature generated by the unified digital signature generation unit.

2. The time stamping system of claim 1, wherein each digital signature unit is controlled not to generate the digital signature for at least one of those time stamped digital documents of times that have no chance of becoming the identical time.

3. The time stamping system of claim 1, wherein the unified digital signature generation unit and the time stamp token generation unit constitute a time stamping authority, while each set of a time acquisition unit, a combining unit, and a digital signature unit constitute a distributed partial time stamping authority.

4. A server device of a time stamping system, the server device comprising:
a plurality of time acquisition units, each time acquisition unit sequentially acquiring time information given in a prescribed constant incremental time unit, in response to a received digital document, independently from other time acquisition units;
a plurality of combining units, provided in corresponding to the plurality of time acquisition units, each combining unit generating a plurality of time stamped digital documents by sequentially combining the received digital document with the time information sequentially acquired by a corresponding one of the time acquisition units, independent from other combining units;
a plurality of digital signature units, provided in correspondence to the plurality of combining units, each digital signature unit generating a digital signature for each time stamped digital document generated by a corresponding one of the combining units, independently from other digital signature units;
a unified digital signature generation unit for selecting a plurality of digital signatures, one digital signature per each of the digital signature units, which are generated by the plurality of digital signature units for one time stamped digital document of an identical time, from a plurality of digital signatures generated by the plurality of digital signature units, and generating a unified digital signature from the selected digital signatures; and
a time stamp token generation unit for generating a time stamp token from said one time stamped digital document and the unified digital signature generated by the unified digital signature generation unit.

5. The server device of claim 4, wherein each digital signature unit is controlled not to generate the digital signature for at least one of those time stamped digital documents of times that have no chance of becoming the identical time.

6. The server device of claim 4, wherein the unified digital signature generation unit and the time stamp token generation unit constitute a time stamping authority, while each set of a time acquisition unit, a combining unit, and a digital signature unit constitute a distributed partial time stamping authority.

7. A time stamping method in a time stamping system formed by a client device and a server device, comprising the steps of:

(a) generating a plurality of digests for a plurality of digital documents at the client device;

(b) combining the plurality of digests generated by the step (a), at the client device;

(c) generating a unified digest from the plurality of digests as combined by the step (b), at the client device;

(d) transmitting a time stamping request containing the unified digest generated by the step (c), from the client device to the server device;

(e) in response to the time stamping request sent from the client device, sequentially acquiring time information given in a prescribed constant incremental time unit, at each one of a plurality of time acquisition units in the server device, independently from other time acquisition units;

(f) generating a plurality of time stamped digital documents at each one of a plurality of combining units, provided in correspondence to the plurality of time acquisition units in the server device, by sequentially combining a data containing the unified digest with the time information sequentially acquired by a corresponding one of the time acquisition units, independently from other combining units;

(g) generating a digital signature at each one of a plurality of digital signature units, provided in correspondence to the plurality of combining units in the server device, for each time stamped digital document generated by a corresponding one of the combining units, independently from other digital signature units;

(h) selecting a plurality of digital signatures, one digital signature per each of the digital signature units, which are generated by the plurality of digital signature units for one time stamped digital document of an identical time, from a plurality of digital signatures generated by the plurality of digital signature units, and generating a unified digital signature from the selected digital signatures, at the server device;

(i) generating a time stamp token from said one time stamped digital document and the unified digital signature generated by the step (h);

(j) transmitting the time stamp token from the server device to the client device; and (k) receiving the time stamp token for the plurality of digital documents from the server device, at the client device.

8. The method of claim 7, wherein at the step (g), each digital signature unit is controlled not to generate the digital signature for at least one of those time stamped digital documents of times the have no chance of becoming the identical time.

9. A method of providing a time stamping service at a server device of a time stamping system, the method comprising the steps of:

(a) sequentially acquiring a time information given in a prescribed constant incremental time unit, in response to a received digital document, at each one of a plurality of time acquisition units in the server device, independently from other time acquisition units;

(b) generating a plurality of time stamped digital documents at each one of a plurality of combining units, provided in correspondence to the plurality of time acquisition units in the server device, by sequentially combining the received digital document with the time information sequentially acquired by a corresponding one of the time acquisition units, independently from other combining units;

(c) generating a digital signature at each one of a plurality of digital signature units, provided in correspondence to the plurality of combining units in the server device, for each time stamped digital document generated by a corresponding one of the combining units, independently from other digital signature units;

(d) selecting a plurality of digital signatures, one digital signature per each of the digital signature units, which are generated by the plurality of digital signature units for one time stamped digital document of an identical time, from a plurality of digital signatures generated by the plurality of digital signature units, and generating a unified digital signature from the selected digital signatures; and (e) generating a time stamp token from said one time stamped digital document and the unified digital signature generated by the step (d).

10. The method of claim 9, wherein at the step (c), each digital signature unit is controlled not to generate the digital signature for at least one of those time stamped digital documents of times that have no chance of becoming the identical time.

11. A computer usable medium having computer readable program codes embodied therein for causing at least one computer to function as a server device of a time stamping system, the computer readable program codes including:

a first computer readable program code for causing said at least one computer to realize a plurality of time acquisition units, each time acquisition unit sequentially acquiring the time information given in a prescribed constant incremental time unit, in response to a received digital document, independently from other time acquisition units;

a second computer readable program code for causing said at least one computer to realize a plurality of combining units, provided in correspondence to the plurality of time acquisition units, each combining unit generating a plurality of time stamped digital documents by sequentially combining the received digital document with the time information sequentially acquired by a corresponding one of the time acquisition units, independently from other combining units;

a third computer readable program code for causing said at least one computer to realize a plurality of digital signature units, provided in correspondence to the plurality of combining units, each digital signature unit generating a digital signature for each time stamped digital document generated by a corresponding one of the combining units, independently from other digital signature units;

a fourth computer readable program code for causing said at least one computer to select a plurality of digital signatures, one digital signature per each of the digital signature units, which are generated by the plurality of digital signature units for one time stamped digital document of an identical time, from a plurality of digital signatures generated by the plurality of digital signature units, and to generate a unified digital signature from the selected digital signatures; and a fifth computer readable program code for causing said at least one computer to generate a time stamp token from said one time stamped digital document and the unified digital signature generated by the fourth computer readable program code.

* * * * *